United States Patent
Payne

(10) Patent No.: US 11,162,542 B2
(45) Date of Patent: Nov. 2, 2021

(54) CLUTCH PISTON THAT APPLIES THROUGH COMPENSATION DAM

(71) Applicant: Schaeffler Technologies AG & Co. KG, Herzogenaurach (DE)

(72) Inventor: Matthew Payne, Glenmont, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 16/812,420

(22) Filed: Mar. 9, 2020

(65) Prior Publication Data
US 2021/0277959 A1    Sep. 9, 2021

(51) Int. Cl.
*F16D 25/0638* (2006.01)
*F16D 13/74* (2006.01)
*F16D 13/72* (2006.01)

(52) U.S. Cl.
CPC ......... *F16D 25/0638* (2013.01); *F16D 13/72* (2013.01); *F16D 13/74* (2013.01)

(58) Field of Classification Search
CPC ....... F16D 25/0638; F16D 13/72; F16D 13/74
See application file for complete search history.

(56) References Cited

U.S. PATENT DOCUMENTS

| | | | | |
|---|---|---|---|---|
| 4,805,752 | A * | 2/1989 | Malloy | F16D 25/0638 192/106 F |
| 2012/0175212 | A1* | 7/2012 | Hart | B60K 6/387 192/48.601 |
| 2014/0284164 | A1* | 9/2014 | Akimoto | F16D 13/52 192/66.3 |
| 2015/0276057 | A1* | 10/2015 | Nakano | F16H 63/34 192/3.57 |
| 2017/0219021 | A1* | 8/2017 | Fliearman | F16D 13/52 |
| 2018/0080506 | A1* | 3/2018 | Margraf | F16D 25/14 |
| 2019/0283565 | A1 | 9/2019 | Nelson | |
| 2020/0215897 | A1* | 7/2020 | Trinkenschuh | B60K 6/387 |

FOREIGN PATENT DOCUMENTS

WO     WO-2019015714 A1 *  1/2019  ............. B60K 6/547

OTHER PUBLICATIONS

"Definition of aperture" retrieved from www.merriamwebster.com (Year: 2021).*

* cited by examiner

*Primary Examiner* — Stacey A Fluhart

(57) ABSTRACT

A hydraulically applied clutch for a vehicle drivetrain includes a hub, a piston, and a compensation dam. The piston is sealed to the hub at a piston outer diameter and a piston inner diameter. The piston has a plurality of axial protrusions for applying an axial force to a clutch plate. The compensation dam is sealed to the hub at a compensation dam outer diameter. The compensation dam has a plurality of apertures for receiving the plurality of axial protrusions. In an example embodiment, the piston outer diameter and the compensation dam outer diameter are axially aligned. In an example embodiment, the hydraulically applied clutch includes a plurality of seals, each installed on a one of the plurality of axial protrusions for sealing the plurality of axial protrusions for the plurality of apertures.

18 Claims, 2 Drawing Sheets

CLUTCH PISTON THAT APPLIES THROUGH COMPENSATION DAM

TECHNICAL FIELD

The present disclosure relates generally to a hydraulically applied clutch, and more specifically to a hydraulically applied clutch with a clutch piston that applies through a compensation dam.

BACKGROUND

Hybrid modules with hydraulically applied clutches are known. One example is shown in commonly-assigned United States Patent Application Publication No. 2019/0283565 titled SHAFT FLOW COUPLER FOR HYBRID ASSEMBLY, hereby incorporated by reference as if set forth fully herein.

SUMMARY

Example aspects broadly comprise a hydraulically applied clutch for a vehicle drivetrain including a hub, a piston, and a compensation dam. The piston is sealed to the hub at a piston outer diameter and a piston inner diameter. The piston has a plurality of axial protrusions for applying an axial force to a clutch plate. The compensation dam is sealed to the hub at a compensation dam outer diameter. The compensation dam has a plurality of apertures for receiving the plurality of axial protrusions. In an example embodiment, the piston outer diameter and the compensation dam outer diameter are axially aligned. In an example embodiment, the hydraulically applied clutch includes a plurality of seals, each installed on a one of the plurality of axial protrusions for sealing the plurality of axial protrusions for the plurality of apertures.

In an example embodiment, the hydraulically applied clutch include a piston return spring for urging the piston away from the compensation dam. In some example embodiments, the hub has a first radial wall and the piston has a second radial wall that contacts the first radial wall when the piston is displaced away from the compensation dam. In an example embodiment, the second radial wall includes a plurality of wall segments, each comprising a portion of a respective piston raised area. In an example embodiment, the hub includes an oil channel disposed axially between the piston and the compensation dam. In an example embodiment, the compensation dam includes a plurality of flow holes disposed radially proximate the piston inner diameter.

In some example embodiments, the hydraulically applied clutch includes a first seal and a second seal. The piston has a first seal groove at the piston outer diameter and the compensation dam has a second seal groove at the compensation dam outer diameter. The first seal is disposed in the first seal groove and the second seal is disposed in the second seal groove. In an example embodiment, the hub includes an inwardly-facing circumferential wall contacting the first seal and the second seal. In an example embodiment, the hydraulically applied clutch includes a snap ring. The hub has a snap ring groove and the snap ring is installed in the snap ring groove for axially retaining the compensation dam. In an example embodiment, the hub forms a portion of a rotor carrier of a hybrid module.

Other example aspects broadly comprise a hybrid module including the hydraulically applied clutch, a housing with a bulkhead, and a bearing supporting the hub on the bulkhead. In an example embodiment, the hybrid module has a third seal. The bulkhead includes a third seal groove and the third seal is installed in the third seal groove to seal the hub to the bulkhead. In an example embodiment, the bulkhead includes a first apply channel, and the hub includes a second apply channel, hydraulically connected to the first apply channel, for providing a hydraulic pressure to the piston to clamp a clutch pack.

In some example embodiments, the hub has a first oil channel disposed axially between the piston and the compensation dam, and the bulkhead has a cooling channel hydraulically connected to the first oil channel for providing a balancing oil to the hydraulically applied clutch. In some example embodiments, the hybrid module includes the clutch plate. The rotor carrier has an inwardly extending spline and the clutch plate has an outwardly extending spline installed on the inwardly extending spline. In an example embodiment, the hybrid module includes the rotor carrier. The rotor carrier includes a second oil channel such that cooling oil from the cooling channel flows through the first oil channel, past the clutch plate, and through the second oil channel.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
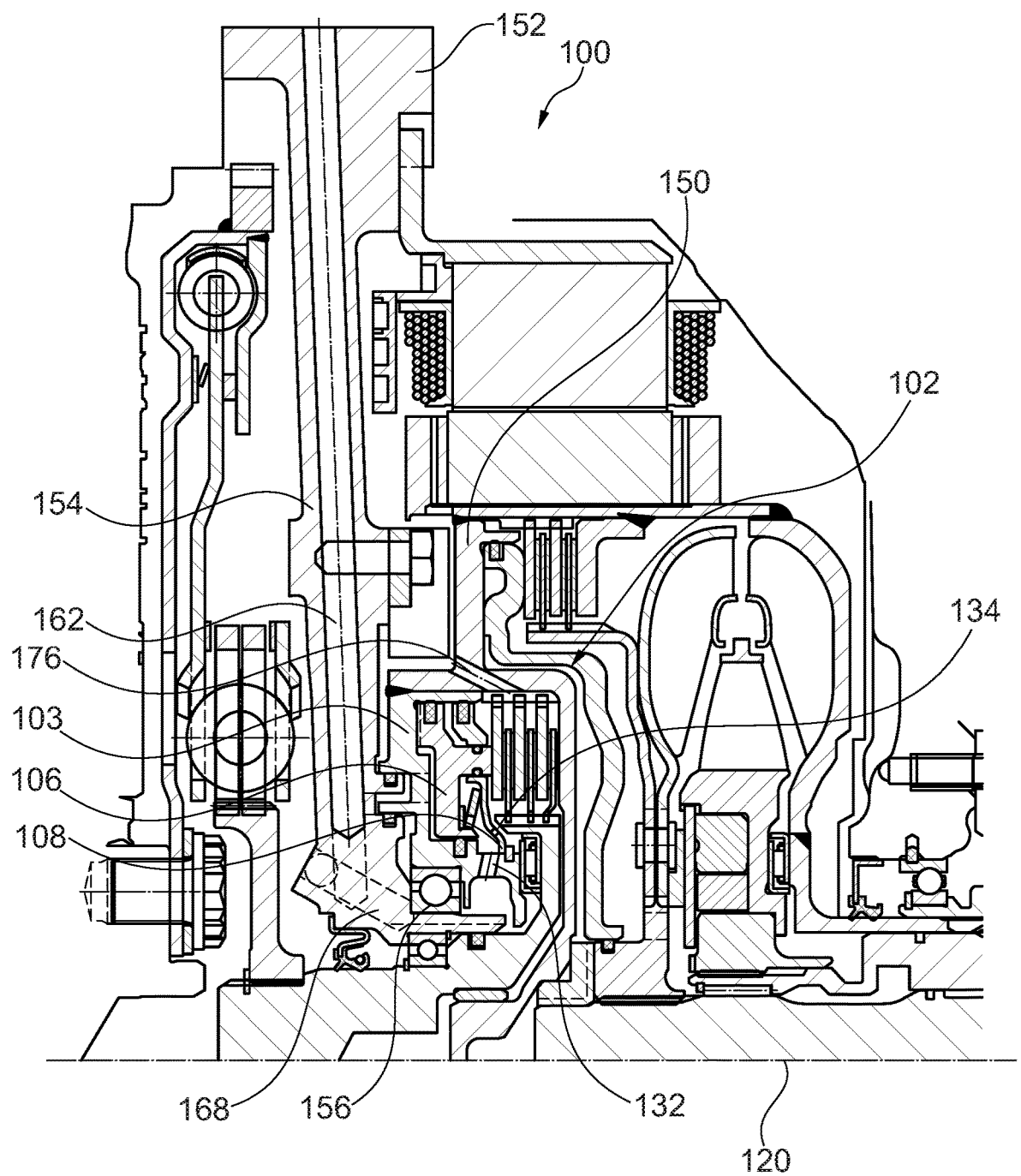
FIG. 1 illustrates a top half cross-sectional view of a hybrid module according to an example aspect of the present disclosure.
Figure 2:
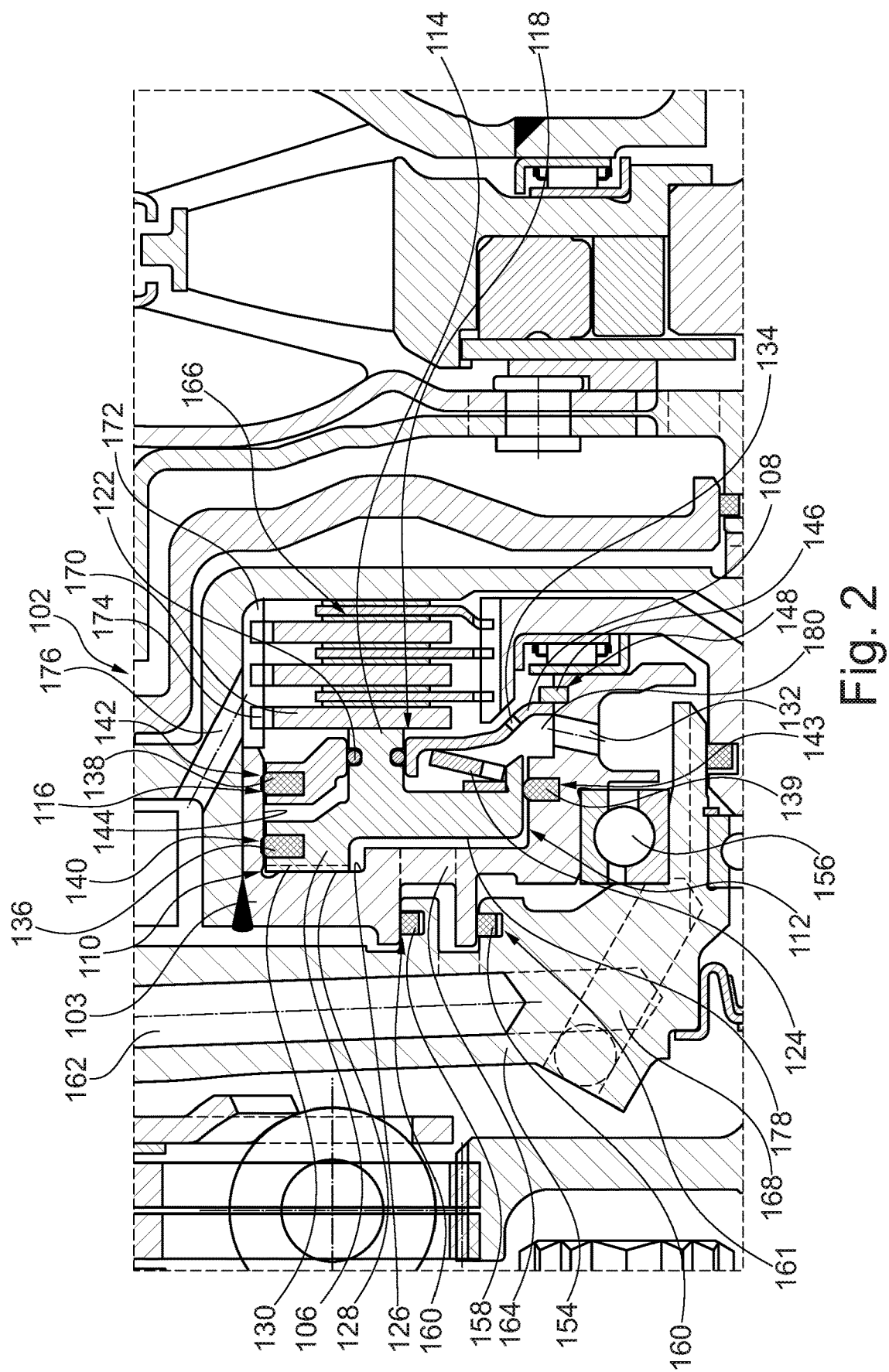
FIG. 2 illustrates a detail view of a hydraulically applied clutch portion of the hybrid module of FIG. 1.

The following description is made with reference to FIG. 1 and FIG. 2. FIG. 1 illustrates a top half cross-sectional view of hybrid module 100 according to an example aspect of the present disclosure. FIG. 2 illustrates a detail view of a hydraulically applied clutch portion of hybrid module 100. Hydraulically applied clutch 102 is for a vehicle drivetrain. Clutch 102 includes hub 104, piston 106, and compensation dam 108. The piston is sealed to the hub at piston outer diameter 110 and piston inner diameter 112.

Piston 106 includes axial protrusion 114 for applying an axial force to a clutch plate as described in more detail below. Although the cross-sectional view of FIG. 1 and FIG. 2 shows only a single axial protrusion 114, piston 106 includes additional axial protrusions (not shown) circumferentially distributed at a same radius as axial protrusion 114. Compensation dam 108 is sealed to the hub at compensation dam outer diameter 116 and includes aperture 118 for receiving axial protrusion 114. Similar to the axial protrusions described above, compensation dam 108 includes multiple apertures 118, each aligned with an axial protrusion 114. Hydraulically applied clutch 102 includes a number of apertures 118 equal to a number of axial protrusions 114.

As can be seen from the figures, piston outer diameter 110 and compensation dam outer diameter 116 are axially aligned. In other words, the two outer diameters are aligned in the axial direction and have a same radius from center axis 120. Hydraulically applied clutch 102 includes seal 122 installed on axial protrusion 114 for sealing axial protrusions to compensation dam 108. As discussed above, piston 106 includes multiple protrusions 114 each fitted with a seal 122 for sealing the protrusion in an aperture 118 of compensation dam 108. In other words, hydraulically applied clutch 102 includes a number of seals 122 equal to the number of axial protrusions 114.

Hydraulically applied clutch 102 includes piston return spring 124 for urging the piston away from the compensation dam. Hub 104 includes radial wall 126, piston 106 includes radial wall 128 that contacts radial wall 126 when the piston is displaced away from the compensation dam. In other words, contact between radial wall 126 and 128 limits an axial travel of piston 106 away from compensation dam 108.

Radial wall 128 includes multiple wall segments. Each wall segment is a portion of a respective piston raised area 130. In other words, the piston includes raised areas 130 with respective wall segments that contact radial wall 126 when the piston is displaced away from the compensation dam. The space between the raised areas permits fluid (and pressure) to build on an entirety of a piston surface area between the piston outer diameter and the piston inner diameter. If the raised areas were omitted, it is possible that the piston and hub radial walls could seal together and, when hydraulic pressure was increased, the axial force from the piston acting on the clutch plate could rapidly increase as the piston surface area subject to the pressure increased as the radial walls were unsealed. Otherwise stated, the raised areas allow a smoother application of force from the piston to the clutch plate.

Hub 104 includes oil channel 132 disposed axially between the piston and the compensation dam, and compensation dam 108 includes flow hole 134 disposed radially proximate the piston inner diameter. Although the cross-sectional view of FIG. 1 and FIG. 2 shows only a single flow hole 134, compensation dam 108 can include additional flow holes (not shown) circumferentially distributed at a same radius as flow hole 134.

Hydraulically applied clutch 102 includes seal 136 and seal 138. Piston 106 includes seal groove 140 at outer diameter 110 and compensation dam 108 includes seal groove 142 at outer diameter 116. Seal 136 is disposed in seal groove 140 and seal 138 is disposed in seal groove 142. Hub 104 includes inwardly-facing circumferential wall 144 contacting seal 140 and seal 142. Seal 139 is installed in seal groove 143 in hub 104 for sealing piston inner diameter 112 to hub 104. Hydraulically applied clutch 102 includes snap ring 146. Hub 104 includes snap ring groove 148 and the snap ring is installed in the snap ring groove for axially retaining the compensation dam. As can be seen from FIG. 1, hub 104 forms a portion of rotor carrier 150 of hybrid module 102.

Hybrid module 102 includes hydraulically applied clutch 102, housing 152 including bulkhead 154, and bearing 156 supporting hub 104 on the bulkhead. Hybrid module 102 includes seal 158. Bulkhead 154 includes seal groove 160 and seal 158 is installed in the seal groove 160 to seal the hub to the bulkhead. Seal 159 installed in seal groove 161 similarly seals the hub to the bulkhead. Bulkhead 154 includes apply channel 162 and hub 104 includes apply channel 164, hydraulically connected to apply channel 162, for providing a hydraulic pressure to the piston to clamp clutch pack 166.

Hub 104 includes oil channel 132 disposed axially between the piston and the compensation dam, and bulkhead 154 includes cooling channel 168 hydraulically connected to oil channel 132 for providing a balancing oil to the hydraulically applied clutch. Hybrid module 102 includes clutch plate 170. Rotor carrier 150 includes inwardly extending spline 172 and clutch plate 170 includes outwardly extending spline 174 installed on the inwardly extending spline. Hybrid module 102 includes rotor carrier 150. The rotor carrier includes oil channel 176 such that cooling oil from cooling channel 168 flows through oil channel 132, past the clutch plate, and through oil channel 176.

Apply pressure and balancing pressure will now be discussed. When clutch engagement is desired, pressure is introduced through bulkhead apply channel 162 and flows through hub apply channel 164 into chamber 178 between the piston and the hub. Seals 136 and 139 seal the piston to the hub to contain apply pressure. Raised areas 130 ensure pressure acts on an entirety of an apply area of piston 106. Meanwhile, flow from bulkhead cooling channel 138 flows through hub oil channel 132 into chamber 180 between the piston and the compensation dam. Oil is retained in the chamber in part due to seal 138 between the compensation dam and the hub, and seals 122 between the compensation dam and the piston protrusion. Once oil has filled chamber 180, oil leaks past compensation dam through flow hole 134 to cool clutch pack 166. Radius of flow hole 134 is strategically placed to maintain an inner diameter of oil in chamber 180 at a same level as inner diameter 112 of piston 106 to balance a dynamic effect of rotating oil in apply chamber 178, ensuring that piston force is only proportional to apply pressure. Once pressure in chamber 178 applies sufficient force on piston 106, spring 124 begins to compress and protrusions 114 apply force to clutch plate 170, engaging clutch pack 166.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS

100 Hybrid module
102 Hydraulically applied clutch
104 Hub
106 Piston
108 Compensation dam
110 Piston outer diameter
112 Piston inner diameter
114 Axial protrusion (piston)
116 Compensation dam outer diameter
118 Aperture (compensation dam)
120 Center axis
122 Seal (protrusion)
124 Piston return spring
126 Radial wall (hub, first)
128 Radial wall (piston, second)
130 Piston raised area
132 Oil channel (hub, first)
134 Flow hole (compensation dam)
136 Seal (piston, first)
138 Seal (compensation dam, second)
139 Seal (hub)
140 Seal groove (piston, first)
142 Seal groove (compensation dam, second)
143 Seal groove (hub)
144 Inwardly-facing circumferential wall (hub)
146 Snap ring
148 Snap ring groove (hub)
150 Rotor carrier
152 Housing
154 Bulkhead
156 Bearing (hub to bulkhead)
158 Seal (bulkhead, third)
159 Seal (bulkhead)
160 Seal groove (bulkhead, third)
161 Seal groove (bulkhead)
162 Apply channel (bulkhead, first)
164 Apply channel (hub, second)
166 Clutch pack
168 Cooling channel (bulkhead)
170 Clutch plate
172 Inwardly extending spline (rotor carrier)
174 Outwardly extending spline (clutch plate)
176 Oil channel (rotor carrier, second)
178 Chamber (piston/hub)
180 Chamber (piston/compensation dam)

What is claimed is:

1. A hydraulically applied clutch for a vehicle drivetrain, comprising:
   a hub;
   a piston, sealed to the hub at a piston outer diameter and a piston inner diameter, comprising a plurality of axial protrusions for applying an axial force to a clutch plate; and
   a compensation dam, sealed to the hub at a compensation dam outer diameter, comprising a plurality of apertures for receiving the plurality of axial protrusions.

2. The hydraulically applied clutch of claim 1 wherein the piston outer diameter and the compensation dam outer diameter are axially aligned.

3. The hydraulically applied clutch of claim 1 further comprising a plurality of seals, each installed on a one of the plurality of axial protrusions for sealing the plurality of axial protrusions to the plurality of apertures.

4. The hydraulically applied clutch of claim 1 further comprising a piston return spring for urging the piston away from the compensation dam.

5. The hydraulically applied clutch of claim 1 wherein:
   the hub comprises a first radial wall; and
   the piston comprises a second radial wall that contacts the first radial wall when the piston is displaced away from the compensation dam.

6. The hydraulically applied clutch of claim 5 wherein the second radial wall comprises a plurality of wall segments, each comprising a portion of a respective piston raised area.

7. The hydraulically applied clutch of claim 1 wherein the hub comprises an oil channel disposed axially between the piston and the compensation dam.

8. The hydraulically applied clutch of claim 1 wherein the compensation dam comprises a plurality of flow holes disposed radially proximate the piston inner diameter.

9. The hydraulically applied clutch of claim 1 further comprising:
   a first seal; and
   a second seal, wherein:
      the piston comprises a first seal groove at the piston outer diameter;
      the compensation dam comprises a second seal groove at the compensation dam outer diameter;
      the first seal is disposed in the first seal groove; and
      the second seal is disposed in the second seal groove.

10. The hydraulically applied clutch of claim 9 wherein the hub comprises an inwardly-facing circumferential wall contacting the first seal and the second seal.

11. The hydraulically applied clutch of claim 1 further comprising a snap ring, wherein:
   the hub comprises a snap ring groove; and
   the snap ring is installed in the snap ring groove for axially retaining the compensation dam.

12. The hydraulically applied clutch of claim 1 wherein the hub forms a portion of a rotor carrier of a hybrid module.

13. A hybrid module comprising:
   the hydraulically applied clutch of claim 12;
   a housing comprising a bulkhead; and
   a bearing supporting the hub on the bulkhead.

14. The hybrid module of claim 13 further comprising a third seal, wherein:
   the bulkhead comprises a third seal groove; and
   the third seal is installed in the third seal groove to seal the hub to the bulkhead.

15. The hybrid module of claim 13 wherein:
   the bulkhead comprises a first apply channel; and
   the hub comprises a second apply channel, hydraulically connected to the first apply channel, for providing a hydraulic pressure to the piston to clamp a clutch pack.

16. The hybrid module of claim 13 wherein:

the hub comprises a first oil channel disposed axially between the piston and the compensation dam; and the bulkhead comprises a cooling channel hydraulically connected to the first oil channel for providing a balancing oil to the hydraulically applied clutch.

17. The hybrid module of claim 16 further comprising the clutch plate, wherein:

the rotor carrier comprises an inwardly extending spline; and the clutch plate comprises an outwardly extending spline installed on the inwardly extending spline.

18. The hybrid module of claim 17 further comprising the rotor carrier, wherein the rotor carrier includes a second oil channel such that cooling oil from the cooling channel flows through the first oil channel, past the clutch plate, and through the second oil channel.

\* \* \* \* \*